United States Patent [19]

Schweiger

[11] Patent Number: 6,142,043

[45] Date of Patent: Nov. 7, 2000

[54] ADAPTER FOR ROTATIONALLY FIXED CONNECTION OF A ROTARY TOOL TO A ROTARY DRIVE MEMBER

[75] Inventor: Alfred Schweiger, Wolfsburg, Germany

[73] Assignee: Volkswagen AG, Wolfsburg, Germany

[21] Appl. No.: 09/274,519

[22] Filed: Mar. 23, 1999

[30] Foreign Application Priority Data

Mar. 23, 1998 [DE] Germany .............. 198 12 654

[51] Int. Cl.[7] .................................................. B25B 23/16
[52] U.S. Cl. .............................................. 81/177.75
[58] Field of Search ................... 81/180.1, 177.2, 81/177.85, 177.75; 403/335, 341

[56] References Cited

U.S. PATENT DOCUMENTS

| | | | |
|---|---|---|---|
| 2,005,202 | 6/1935 | Pilger | 81/177.75 |
| 2,436,336 | 2/1948 | Slater | 81/177.75 |
| 4,945,789 | 8/1990 | Martinengo . | |
| 5,609,079 | 3/1997 | Hashimoto | 81/177.75 |

FOREIGN PATENT DOCUMENTS 0368813  5/1990  European Pat. Off. .

*Primary Examiner*—David A. Scherbel
*Assistant Examiner*—Joni B. Danganan
*Attorney, Agent, or Firm*—Baker Botts L.L.P.

[57] ABSTRACT

An adapter for rotationally fixed connection of a rotary tool to a rotary drive member includes an intermediate part coupled in rotationally fixed relation to a rotary drive coupling part by a first slide guide while permitting displacement of the intermediate part in a first direction transverse to the longitudinal axis of the adapter and coupled in rotationally fixed relation to a rotary tool by a second slide guide permitting displacement of the tool coupling part relative to the intermediate part in a second direction transverse to the longitudinal axis of the adapter and perpendicular to the first direction. By providing transverse slide guides for the intermediate part, the tool coupling part is mounted in a radially floating manner inside a housing part.

5 Claims, 3 Drawing Sheets

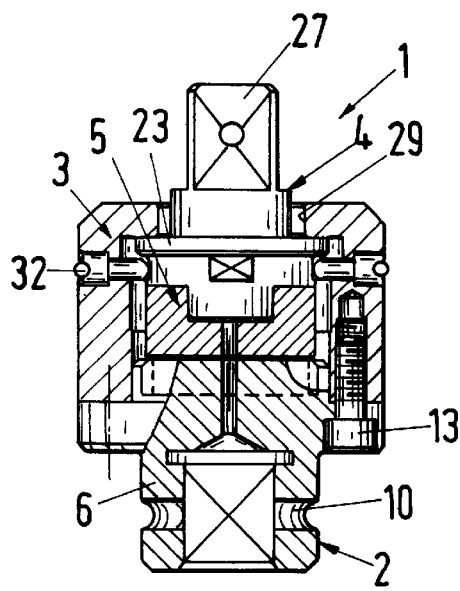
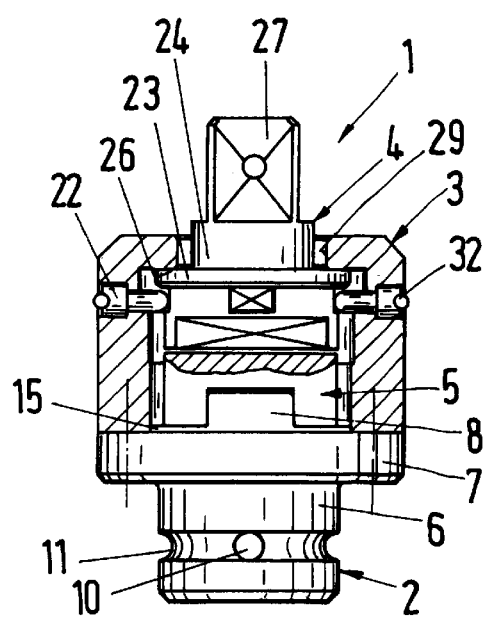
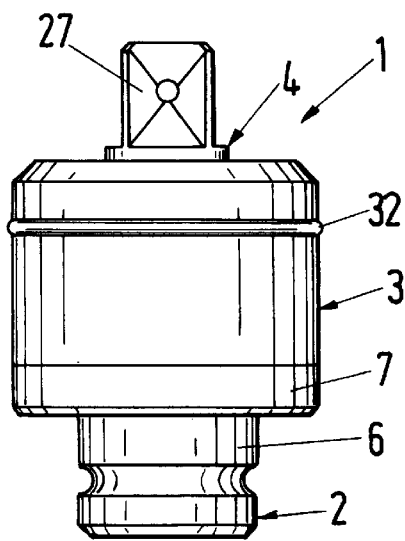

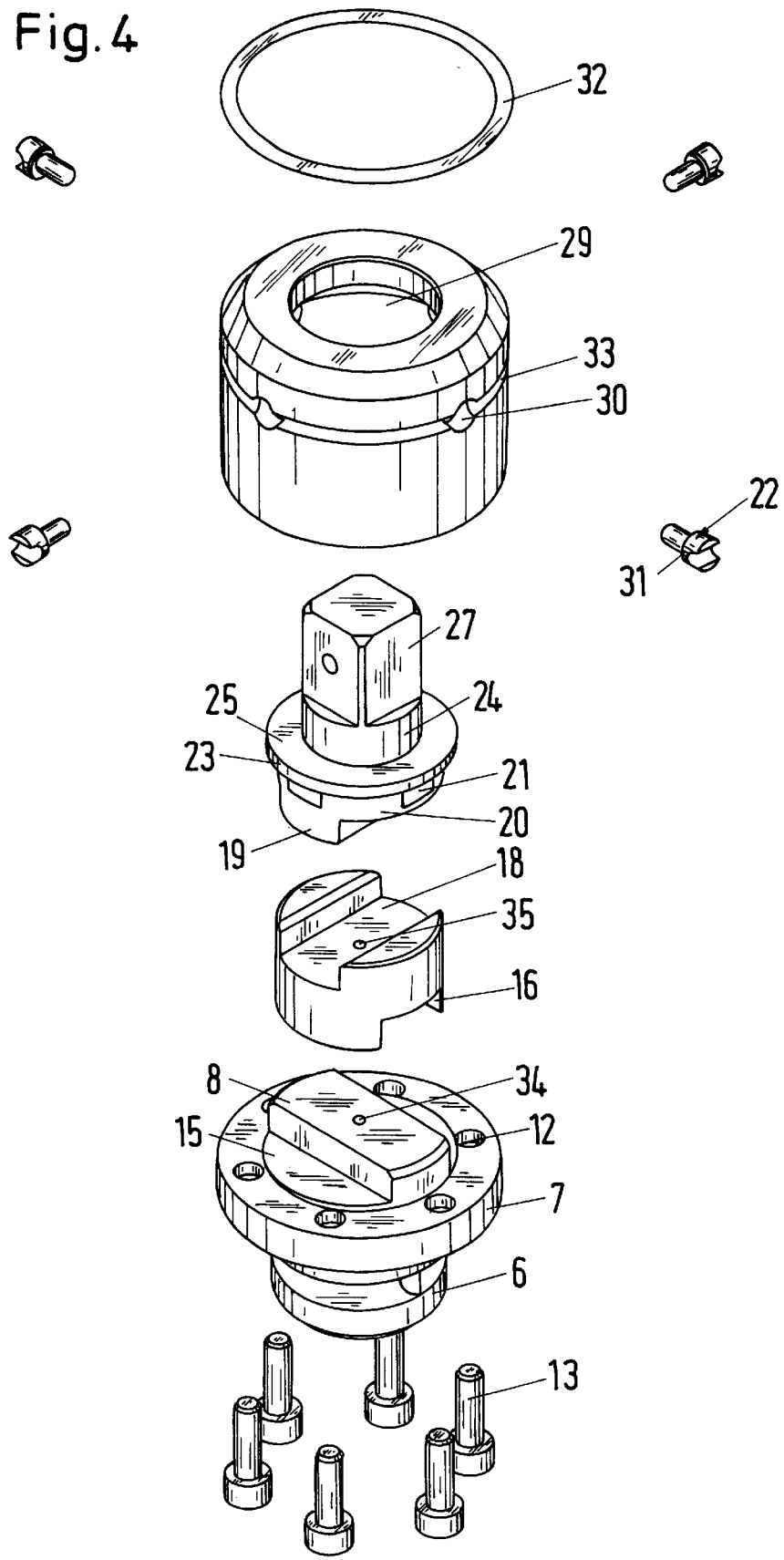

ADAPTER FOR ROTATIONALLY FIXED CONNECTION OF A ROTARY TOOL TO A ROTARY DRIVE MEMBER

BACKGROUND OF THE INVENTION

This invention relates to adapters for rotationally fixed connections for rotary tools, such as screw drivers, to rotary drive members, such as screw holders.

In automated connection of parts, for example screws, in motor vehicle construction, the problem may arise that a screw being driven by a special screw-connecting machine or robot is not positioned in exact alignment with a matching threaded hole. For example, the threaded hole, because of inaccurate fabrication, may not be located exactly in the intended place. If the threaded hole is not engaged exactly by the screw, this may cause error messages and interruptions of the screw driving operation. In addition, it is possible that parts may be damaged.

To avoid these problems, therefore, it has been proposed that special screw driving machines or robots be equipped with sensors to locate the threaded holes. Such devices add substantially to the cost of the equipment.

U.S. Pat. No. 4,945,789 discloses a screwdriver in which a screw coupling part inside a housing can be tilted somewhat to compensate for misalignment of the screw out the hole. However, this conventional device causes an oblique tilting of the axis of screw rotation relative to the centerline of the threaded hole, which is disadvantageous. Furthermore, it requires considerable space and has a relatively complicated structure.

SUMMARY OF THE INVENTION

Accordingly, it is an object of the present invention to provide an adapter for rotationally fixed connection of a rotary tool to a rotary drive member which overcomes disadvantages of the prior art.

Another object of the invention is to provide a rotary tool adapter having an especially compact design and which is capable of being manufactured in a simple and economical manner.

These and other objects of the invention are attained by providing an adapter for a rotary driving tool having an intermediate part coupled with a rotary drive coupling part by a first slide guide which permits lateral displacement of the intermediate part in a first direction transverse to the longitudinal axis of the adapter and a tool coupling part coupled to the intermediate part by a second slide guide permitting lateral displacement of the tool coupling part relative to the intermediate part in a second direction which is transverse to the longitudinal axis of the adapter and perpendicular to the first direction.

By thus providing two transverse slide guides according to the invention, the tool coupling part is mounted in a radially floating manner inside a housing part. In this way, the rotary motion of the rotary drive member can be transmitted to a driven tool coupling member, for example a screw holder, even if the longitudinal axis of the driven member is offset laterally from that of the rotary drive coupling part. Moreover, the adapter according to the invention makes possible a parallel displacement between these two longitudinal axes with no oblique tilt of the longitudinal axis of the driven member.

It is of special advantage that the adapter according to the invention can be produced in a simple and economical manner and in very compact design. For example, adapters can be produced that are hardly larger than a screw nut. Furthermore, the adapter according to the invention can be very sturdily built.

According to an advantageous embodiment, the rotary drive coupling part has a projecting coupling web engaging a first transverse groove of an intermediate member and the tool coupling part has a projecting coupling web engaging a second transverse groove of the intermediate member which is perpendicular to the first transverse groove. This embodiment is especially simple and economical to manufacture and furthermore is capable of transmitting very substantial torques.

A simple centering of the tool coupling part is achieved by providing resiliently biased pins in the housing part which extend toward the tool coupling part and are guided for radial displacement in the housing part by which the tool coupling part is urged into a centered position within the housing part. These pins are urged against the tool coupling part under spring tension, the tension preferably being generated by a rubber ring surrounding the housing part and engaging the outer ends of the pins.

BRIEF DESCRIPTION OF THE DRAWINGS

Further objects and advantages of the invention will be apparent from a reading of the following description in conjunction with the accompanying drawings, in which:

FIG. 1 is a side view, mostly in section, illustrating a representative embodiment of an adapter according to the invention;

FIG. 2 is a side view, partly in section, illustrating the adapter of FIG. 1 rotated at an angle of 90°;

FIG. 3 is a side view of the adapter of FIG. 1;

FIG. 4 is an exploded view of the adapter of FIG. 1;

DESCRIPTION OF PREFERRED EMBODIMENTS

Figure 5:
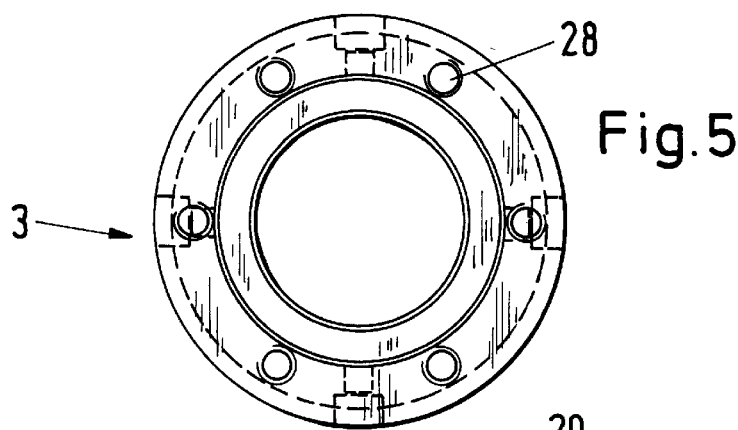
FIG. 5 is a bottom view showing the housing part of the adapter.

In the typical embodiment of the invention illustrated in the drawings, an adapter 1, shown in FIGS. 1–3, is arranged for attachment of a tool, not shown, in the form of a screw holder for automatically holding a screw to be driven, to a rotary drive tool, also not shown, in the form of a rotary drive spindle, which may for example be part of a robot. The screw holder is attached to what is seen in FIGS. 1–3 as the upper end of the adapter 1, and the adapter itself is attached to the screw spindle at its lower end.

The adapter 1 consists essentially of a rotary drive coupling part 2, a housing part 3 affixed to the rotary drive coupling part 2, and a tool coupling part 4 mounted inside the housing part 3 in a radially floating manner and connected in rotationally fixed relation to the rotary drive coupling 2 through a transversely displaceable intermediate part 5.

Figure 9:
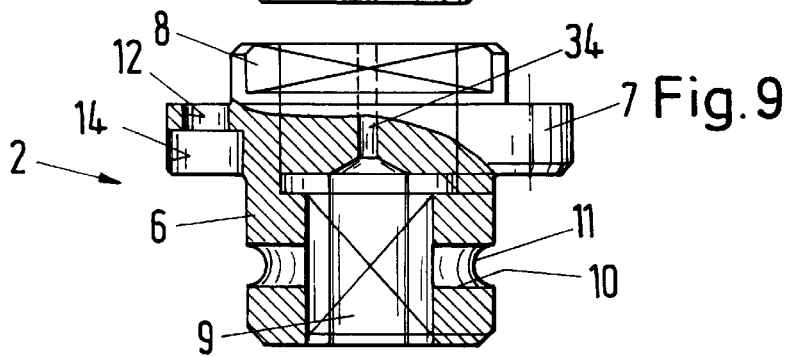
FIG. 9 is a side view, partly in section, of the rotary-drive coupling part.

As best seen in FIGS. 4 and 9, the rotary drive coupling part 2 has an essentially rotationally symmetrical configuration and includes a cylindrical base segment 6, a cylindrical flange segment 7 projecting radially outwardly beyond the base segment 6, and a coupling web 8 projecting away from the flange segment 7.

In the base segment 6, a central interior square hole 9 is provided to receive a matching square bolt, not shown, of the rotary drive spindle. For axial retention of the square bolt of the drive spindle, a transverse hole 10 is provided in the base segment 6 through which a matching cotter pin may be passed. This cotter pin is kept in the hole 10 by an O-ring, not shown, inserted in a circumferential groove 11 extending over the transverse hole 10.

As best seen in FIG. 4, the flange segment 7 of the rotary drive coupling part 2 is formed with six through holes 12 uniformly distributed around its circumference and extending parallel to the longitudinal axis of the rotary drive coupling part 2. These holes 12 receive matching screws 13, shown in FIGS. 1 and 4. On the side toward the base segment 6, the through holes 12 are enlarged by counterbores 14 (see FIG. 9) so that the heads of the screws 13 are received completely into the flange segment 7. The screws 13 provide a fixed connection of the rotary guide coupling part 2 to the housing part 3, which is also of substantially rotationally symmetrical configuration and is mounted on the flange segment 7. A short cylindrical centering shoulder 15 (see FIGS. 2 and 4) projects outwardly beyond the flange segment 7 inside the housing part 3 and centers the flange segment with respect to the axis of the rotation.

The coupling web 8 connects the intermediate part 5, which is supported inside of the housing part 3, in a transversely displaceable but rotationally fixed manner to the rotary drive coupling part 2. For this purpose, the coupling web 8 is centrally located on the centering shoulder 15 and extends transversely across the entire diameter of the centering shoulder 15. The two lateral sides of the coupling web 8 extend parallel to each other and are spaced from each other by a distance equal to about half of the diameter of the centering shoulder 15.

As best seen in FIGS. 2 and 4, the coupling web 8 of the rotary drive coupling part 2 is received in a first transverse groove 16 of the intermediate part 5 which is located in one end face of the intermediate part 5 and extends across its diameter. The width of this first transverse groove 16 is slightly greater than that of the coupling web 8 so that the intermediate part 5 can be shifted laterally transverse to the longitudinal axis of the adapter along the coupling web 8. To permit such a transverse displacement inside the housing part 3, the housing part 3 has a central cylindrical inner cavity 17 (see FIG. 6) with a diameter which is greater than the outside diameter of the intermediate part 5, which is likewise essentially cylindrical.

On the face of the intermediate part 5 opposite to the first transverse groove 16, a second transverse groove 18 is provided. This groove is shaped in essentially the same manner as the first transverse groove 16 but is oriented at an angle of 90° to the first groove. The two transverse grooves 16 and 18 thus extend at right angles with respect to each other but are spaced in the longitudinal direction of the intermediate part 5 by a distance approximately to the depth of each of the transverse grooves 16 and 18.

Figure 7:
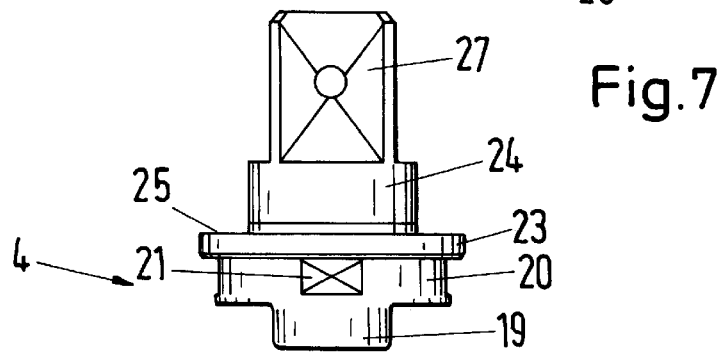
FIG. 7 is a side view of the tool coupling part.
Figure 8:
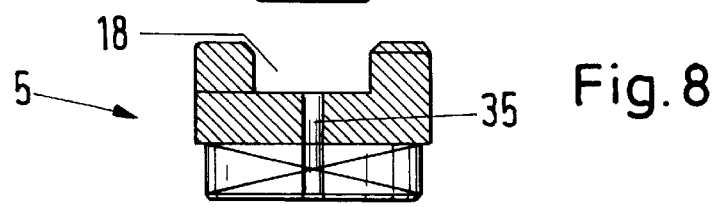
FIG. 8 is a cross-sectional view of the intermediate part.

The second transverse groove 18 receives a coupling web 19 (see FIGS. 1 and 7) which projects from the tool coupling part 4 and is displaceable along the second transverse groove 18. The tool coupling part 4 is thus connected by the coupling web 19 in rotationally fixed relation to the intermediate part 5, but at the same time is displaceable in a direction which is transverse to the longitudinal axis of the adapter and is at 90° to the direction of displacement of the intermediate part 5.

The coupling web 19 of the tool coupling part 4 projects from a substantially symmetrical centering segment 20. This centering segment 20 has on its outer periphery four flats 21 uniformly distributed in the circumferential direction, which are engaged by inner ends of radially directed pins 22. The pins 22, which are described in more detail later, tend to hold the tool coupling part 4 centrally positioned inside the housing part 3 (see FIGS. 1 and 2). A cylindrical holding segment 23 adjacent in the axial direction to the segment 20 has a distinctly larger diameter than a following transitional segment 24, thereby forming a shoulder 25 (see FIG. 7) on the holding segment 23. This shoulder 25 extends beyond an inner bearing surface 26 in the housing part 3 (FIG. 6) which is perpendicular to the longitudinal axis of the adapter, thereby fixing the tool coupling part 4 inside the housing part 3 in an axial direction. The cylindrical transition segment 24 has a standard connection segment 27, of square cross section, on which the screw holder, not shown, may be attached in a conventional manner.

Figure 6:
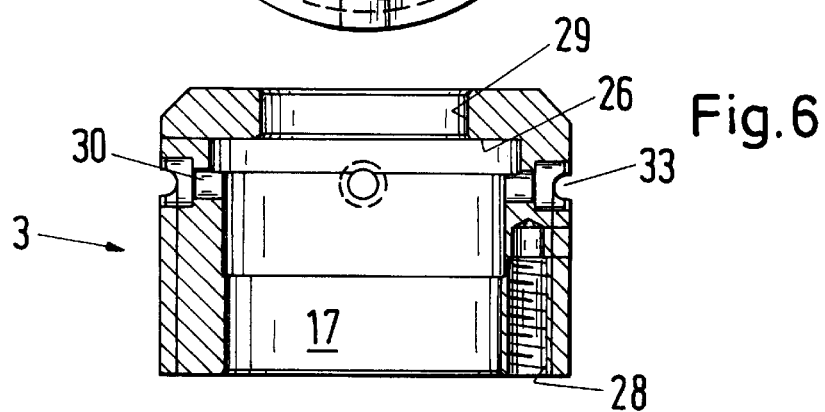
FIG. 6 is a view in longitudinal section of the housing part of FIG. 5.

The housing part 3 shown in FIGS. 5 and 6 is essentially cup-shaped and has the same outside diameter as that of the flange segment 7 of the rotary drive coupling part 2. In the side wall of the housing part 3, threaded holes 28, aligned with the through holes 12 of the flange segment 7, are provided, into which the screws 13 are screwed. The outer wall of housing part 3 has a central opening 29 with a diameter greater by a predetermined amount than the outside diameter of the transition segment 24 of the tool coupling part 4 which extends through the passage 29. This permits radial floating of the tool coupling part 4, i.e. a motion transverse to the longitudinal axis of the adapter, without causing this tool coupling part to touch the passage 29.

The four radial pins 22 uniformly distributed around the circumference of the housing part 3 are longitudinal displaceable in corresponding radial holes 30 in the side wall of the housing part 3. They project inwardly far enough into the cavity 17 of the housing part 3 so that, in the centered position of the tool coupling part 4, they are simultaneously in engagment with the flats 21 of the centering segment 20. The inward displacement of the pins 22 is limited by a head segment 31 of larger diameter on each pin which engages a shoulder of the corresponding radial hole 13 in the housing part.

A encircling rubber ring 32 (see FIGS. 1–4) is placed over the pins 22 in a matching outer peripheral groove 33 so that the pins 22 are continuously urged radially inwardly into the position shown in FIGS. 1 and 2.

If the longitudinal axis of the tool, i.e. the screw holder, is not aligned with that of the rotary drive coupling part 2, the tool coupling part 4 is shifted laterally from its central position inside the housing part 3, the pins 22 being alternately thrust radially outwardly against the tension of the rubber ring 32 as the adapter is rotated. During rotation of the adapter the coupling web 19 shifts longitudinally within the second transverse groove 18 and the coupling web 8 shifts longitudinally within the first transverse groove 16 of the intermediate part in directions transverse to the longitudinal axis of the adapter.

Central lubrication orifices 34 and 35 are provided on the longitudinal axis of the adapter 1 in the rotary drive coupling part 2 and the intermediate part 5 so that a lubricant can be supplied to the transverse grooves 16 and 18 and to the coupling web 8 and the coupling web 19.

Although the invention has been described herein with reference to specific embodiments, many modifications and variations therein will readily occur to those skilled in the art. Accordingly, all such variations and modifications are included within the intended scope of the invention.

I claim:

1. An adapter for rotationally fixed connection of a rotary tool to a rotary drive member comprising:

a rotary drive coupling part capable of being fixed to the rotary drive member;

a housing part;

a tool coupling part connected by an intermediate part in rotationally fixed relation to the rotary drive coupling part;

a first slide guide coupling the intermediate part to the rotary drive coupling part while permitting displacement of the intermediate part in a first direction transverse to the longitudinal axis of the adapter; and a second slide guide coupling the tool coupling part to the intermediate part while permitting displacement of the tool coupling part relative to the intermediate part in a second direction transverse to the longitudinal axis of the adapter.

2. An adapter according to claim I wherein the rotary drive coupling part comprises a projecting coupling web engaging a first transverse groove in the intermediate part and the tool coupling part comprises a projecting coupling web engaging a second transverse groove in the intermediate part which extends perpendicular to the first transverse groove.

3. An adapter according to claim 1 including a plurality of pins which are radially displaceable in the housing part and which are biased toward the tool coupling part, causing the tool coupling part to be urged toward a centered position within the housing part.

4. An adapter according to claim 3 including a rubber ring encircling the housing part and engaging the pins for urging the pins toward a centered position.

5. An adapter according to claim 4 wherein the rubber ring is positioned in an outer peripheral groove of the housing part.

* * * * *